Sept. 24, 1957  I. W. LICHTENFELS  2,807,770
GROUNDING AND OPEN CIRCUIT PROTECTION FOR SERIES MOTORS
Filed Sept. 8, 1954
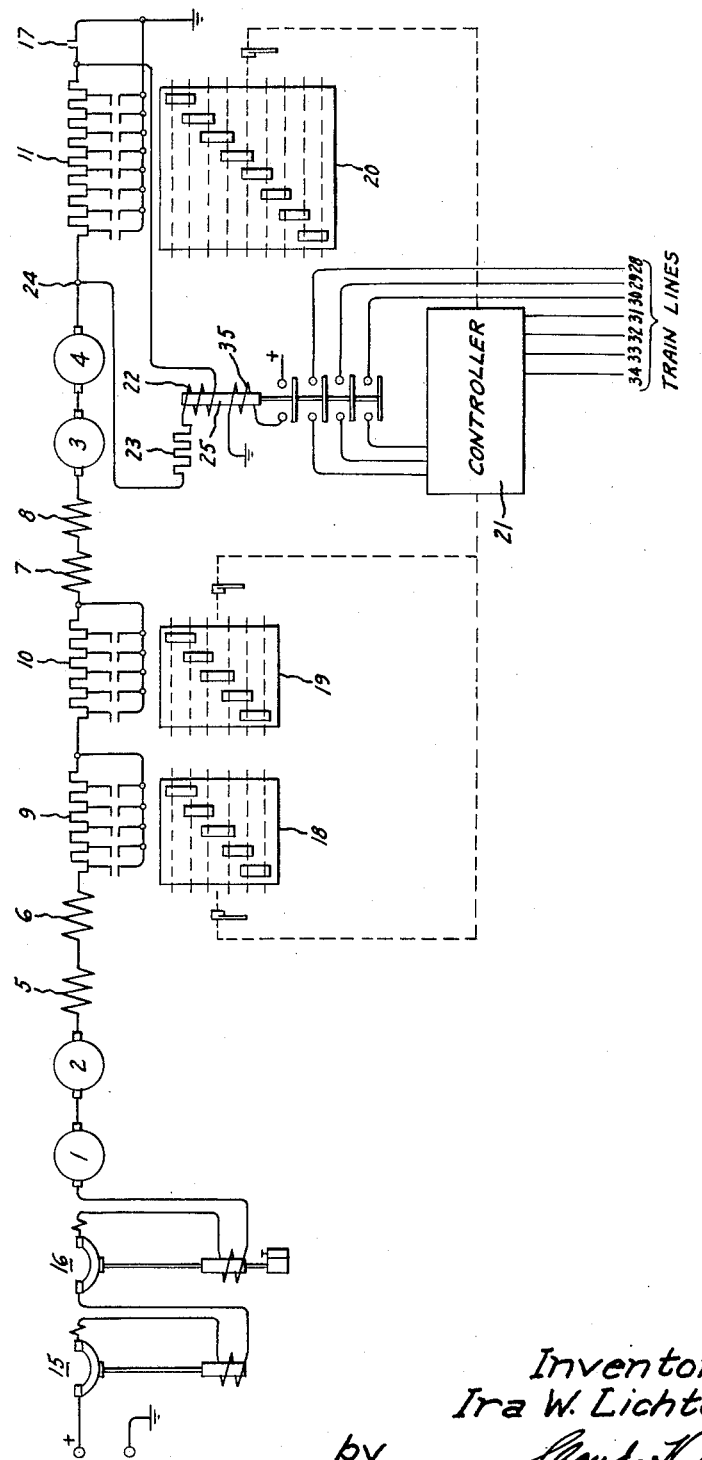
Inventor:
Ira W. Lichtenfels,
by ⟨signature⟩
His Attorney.

United States Patent Office 2,807,770
Patented Sept. 24, 1957

2,807,770

GROUNDING AND OPEN CIRCUIT PROTECTION FOR SERIES MOTORS

Ira W. Lichtenfels, Harborcreek, Pa., assignor to General Electric Company, a corporation of New York Application September 8, 1954, Serial No. 454,748

6 Claims. (Cl. 318—547)

This invention relates to motor protection systems and more particularly to a protective system for serially connected traction motors in the powered units of a multiple unit subway train.

In a powered unit of a multiple unit train, a ground fault or open circuit has been found to be very damaging when the rail vehicle is connected for high speed application of dynamic braking. Often it is impossible for the engineman to know of a fault condition in a trailing unit until he sees the smoke from the damaged traction motor. This is most destructive where the power units are automatically accelerated and braked and where there is not a complicated protective system to disconnect the motors under all fault conditions.

Therefore, it is an object of my invention to provide a simple and reliable system for protecting traction motors against ground faults or open circuits.

Briefly, in accordance with one aspect of my invention, I have serially connected across the power source which is grounded at one terminal the traction motors of the trailing unit in the train with a current limiting resistor connected at the ground return. A sensing means connected across the load resistor actuates an armature to prevent operation of the automatic controller means whenever the voltage across the resistor is less than the predetermined amount when the motors are initially connected at standstill. This disabling of the automatic controller prevents removal of the load resistor in series with the traction motors, prevents the motors being switched from series to parallel operation, and prevents application of dynamic braking. Thus the motors are protected whenever the voltage across the resistor is reduced by an open circuit or damaging ground fault in the series motor circuit.

For a more complete understanding of my invention, reference should be made to the accompanying drawing which shows one circuit diagram for carrying out this grounding protection system.

Referring to the drawing, I have shown a preferred embodiment of my invention having the series traction motors 1, 2, 3 and 4 of one of the trailing units of a multiple unit train initially connected across the source of power serially so that the voltage drop across each component of the circuit will be substantially less than that across the source of power. The main fields, commutating fields and compensating fields, for the traction motor 1 are shown schematically as the winding 5 and the other motors have fields shown schematically as windings 6, 7 and 8, respectively.

To reduce the surge and starting current during both accelerating and dynamic braking, load resistors 9 and 10 are placed in the circuit. The main series starting load resistor is shown schematically at 11. When the power is initially applied to the traction motors 1, 2, 3 and 4 with the self-powered unit at standstill, all of the components are serially connected across the power supply through the over-current trip switches or circuit breakers 15 and 16 and grounding contact 17. When the motors are at standstill or initially accelerating, most of the power is dissipated as $I^2R$ in the resistors 9, 10 and 11. I prefer to connect the motors in series for starting so that the maximum current may be passed through the motors with only one current path. A parallel arrangement would double the $I^2R$ losses, and at standstill these losses consume nearly all the power. As the motors start and the back E. M. F. builds up, the series resistors are "notched" out, shorting the various taps thereon in the conventional manner by the contacts of the drum contactors 18, 19 and 20 which form a part of the automatic controller system shown as the block 21.

The use of two circuit breakers 15 and 16 provides protection from surge currents or sustained overloads during motoring, but does not give the proper protection during dynamic braking. One of the circuit breakers is relatively high current, fast-acting and the other one is designed to protect the system from a slight overload over a long period of time. These various circuit breakers are well known and their details are not part of this invention.

In order to give the desired protection against ground faults and open circuits, a sensing means shown as a relay coil 22 and a load current limiting resistor 23 are serially connected across a portion of the series circuit. One end of the coil 22 is connected to ground through the grounding switch 17 at the end of the series circuit as shown in the drawing. In order that this relay coil 22 may be responsive to conditions in this series circuit, the coil is connected to some point in the system that has more than a predetermined voltage above ground when the series system is initially connected across the source of power and functioning properly. One such connection point 24 is shown in the drawing as between the armatures 3 and 4 and the main load resistor 11, whereby the voltage across the resistor 11 is applied to the coil 22 and resistor 23. This voltage across the resistor 11 reaches a predetermined value when the self-powered unit is initially connected without damaging ground faults or open circuits.

The relay coil 22 actuates an armature 25 that, when picked up, connects the controller to be automatically operated from the train wires 28, 29, 30, 31, 32, 33 and 34 for accelerating and braking the traction motors 1, 2, 3 and 4. Such a control system is not a part of this invention and a suitable arrangement for automatic acceleration and control of a self-powered unit in response to train wire signals is shown in Patent 2,566,898 of Harold G. Moore and myself, issued September 4, 1951, and assigned to the assignee of the present invention. At any time the relay armature 25 of relay coil 22 drops to disconnect the accelerating train lines 28 and 29 and the dynamic braking train line 30 from the controller, the automatic operation or acceleration of the self-powered unit of a multiple unit train is prevented. Thus the engineman in the lead cab cannot reduce the resistance in a faulty traction motor circuit because of the coil 22 sensing a low voltage across resistor 11. Of course, the disabling connection may be mechanical, preventing any movement or progression of said controller 21 under fault conditions. In any case the controller is disabled when the voltage across resistor 11 remains below a predetermined amount. After armature 25 is picked up by coil 22, the resistor 11 is notched out. However, the armature 25 is maintained in picked up position by the holding coil 35.

Should a ground fault or open circuit occur at any point in this series motor circuit, each of the motor components will be protected. A grounding fault occurring in the armatures 1 or 2 or their respective field windings 5 or 6 would immediately trip the high speed circuit breaker 15, removing the entire system from the power lines. When the high speed circuit breaker has been tripped, the relay coil 22 has not been energized because of the shunting ground connection. Therefore, the controller of this particular vehicle cannot be advanced to a position where dynamic braking could be applied.

A severe ground fault in resistors 9, 10 or field windings 7 and 8 also will prevent energization of the coil 22 so that the controller 21 of this self-powered unit cannot be notched out, the motors cannot be accelerated, nor can dynamic braking be applied. Such a ground fault may cause the high current circuit breaker 15 to open the circuit or it may cause the slight overload slow break circuit breaker 16 to open the circuit. If the current is not sufficient to open either of the circuit breakers, the motors 1 and 2 will simply be run in series without any damage to them.

A ground fault occurring in the armatures 3 and 4 usually will not produce sufficient current to actuate the circuit breakers 15 or 16, but a severe ground fault will remove the voltage across the coil 22 to prevent the relay 25 from operating and prevent the controller 21 from being notched out. Thus, dynamic braking which would be fatal to these grounded motors cannot be applied with this fault. A ground fault in the resistor 11 may reduce the voltage across coil 22 sufficiently to prevent operation of the relay. If the fault does not prevent operation of the automatic controller 21, the short is not likely to be great enough to cause any damage to the motors 1, 2, 3 or 4.

An open circuit in any of the motor components will, of course, prevent current flow in the resistor 11 and coil 22. Thus this type of fault will also prevent the automatic operation of the controller 21. This is important to a fully protected system when it is realized that an open circuit is often formed by or found with a a ground fault at a lower potential so that dynamic braking would be destructive if applied.

In summary, operation of the controller 21 after the series motor circuit has been connected to the supply source requires energization of the relay coil 22 sufficient to pick up its armature 25 and thereby mechanically release or electrically energize the controller 21. Any ground fault or open circuit at a point that would normally be above the coil 22 connection point 24 to the series circuit of the motors will reduce or eliminate the voltage across the coil 22 and prevent operation of the relay armature 25.

The current limiting resistor 23 is designed to prevent operation of coil 22 at any time that there is a dangerous ground fault below the connection point 24 which reduces the voltage below a predetermined amount. In other words, the coil 22 senses any open or ground fault that might damage the motors and prevents the operation of the automatic controller 21 whenever the system contains a severe ground or open circuit.

It is preferred that this resistor 23 be of several hundred ohms so that the current through coil 22 will never exceed ½ amp. An open circuit at a point below the connection 24 of coil 22 generally will not damage the traction motors because of the current limiting feature of resistor 23. However, the motors will not carry a working load until the train has accelerated sufficiently to short the open in resistor 11.

While I have shown and described a particular embodiment of this invention, further modifications and improvements will occur to those skilled in the art. Of course, this protection system would work equally well if motors 1, 2, 3 and 4 were replaced by a single series motor. I therefore contemplate by the appended claims to cover any such modifications as will fall within the true spirit and scope of my invention.

What I claim as new and desire to secure by Letters Patent of the United States is:

1. In a self-powered unit of a multiple unit train, a fault protection system for serially connected series traction motors connectable for energization across a power source having a power line and a ground return comprising two pairs of serially connected series traction motors, a load resistor having a plurality of taps thereon to provide impedance control, connections for serially connecting said pairs of motors to form a series circuit, said resistor serially connected between said series circuit and ground, an over-current trip switch serially connected between said series circuit and the power line, a controller to short the various taps of said resistor to reduce the resistance in series with said traction motors, and a relay having a coil and an armature, said relay coil connected between a connection point on said circuit and ground to receive an operating voltage when there is no open circuit or damaging ground fault in said circuit, said relay armature operatively connected to disable said controller when said coil remains de-energized to prevent shorting of said resistor, or application of dynamic braking.

2. In a powered unit of a multiple unit railway train, an open circuit and ground fault protection system for serially connected series traction motors connectable for energization across a power source having a power line and a ground return, comprising two series traction motors connected in a series circuit, a load resistor having a plurality of shorting taps thereon, an over-current trip switch serially connected between said series circuit and the power line, connections for serially connecting said resistor between said series circuit and ground to provide a current limit in said series circuit, controller means connected to be automatically operated from a train line for reducing the resistance in series with said traction motors, and a relay having a coil and an armature, said relay coil connected between a connection point on said circuit and ground so as to receive an operating voltage when there is no open circuit or damaging ground fault between said point and the power line, said relay armature operatively connected to disable said controller when said coil remains de-energized.

3. A ground fault and open circuit protection system for a traction motor connectable across a source of power having one line grounded, comprising a current limiting impedance, connections for connecting the traction motor in series with said impedance to form a series circuit across the source of power with said impedance connected at one end to the grounded power line, control means adapted to shunt portions of said impedance to relatively increase the proportion of the power applied to the traction motor, train lines for controlling said control means, sensing means connected to said series circuit and adapted to be connected to the grounded power line for sensing a predetermined voltage across and thereby a predetermined current in said impedance, and means operably connected to said sensing means and operatively connected to said control means to prevent connection of said train lines to said control means until said predetermined voltage is sensed by said sensing means.

4. A ground fault and open circuit protection system for series traction motors connectable across a source of power having one line grounded, comprising a pair of serially connected traction motors, a current limiting impedance, connections for connecting one end of said pair of traction motors to said source of power, other connections for connecting said impedance between said motors and the grounded power line to form a series circuit control means adapted to shunt portions of said impedance to relatively increase the proportion of the power applied to said pair of traction motors, train lines for controlling said control means, sensing means adapted to be connected between a voltage tap on said series circuit and the grounded power line for sensing a predetermined voltage across a portion of said circuit and thereby a predetermined current in said portion, and means operably connected to said sensing means and operatively connected to said control means to prevent operation of said control means until said predetermined voltage is sensed by said sensing means.

5. A ground fault and open circuit protection system for series traction motors connectable across a source of power having one line grounded, comprising a current limiting impedance, connections for connecting said impedance to the grounded power line, connections for serially connecting a pair of the traction motors between said impedance and the other power line to form a series circuit thereacross, controller means adapted to shunt portions of said impedance to relatively increase the proportion of the power applied to said pair of traction motors, train lines for controlling said controller means, sensing means connected to said series circuit and adapted to be connected to the grounded power line for sensing a predetermined voltage across a portion of said circuit and thereby a predetermined current in said portion, and means operably connected to said sensing means and operatively connected to said controller means to prevent operation of said controller means until said predetermined voltage is sensed by said sensing means.

6. A ground fault and open circuit protection system comprising a pair of series motors serially connected, a current limiting impedance, connections for connecting said motors in series with said impedance to form a series circuit across a source of power with said impedance connected at one end to a grounded power line, controller means adapted to shunt portions of said impedance to relatively increase the proportion of the power applied to said motors, said controlling means also adapted to connect said motors for dynamo braking, train lines for controlling said controller means, sensing means connected to said series circuit and adapted to be connected to said grounded power line for sensing a predetermined voltage across a portion of said circuit and thereby a predetermined current in said portion, and means operably connected to said sensing means and operatively connected to said controller means to prevent connection of said controller means to said train lines until said predetermined voltage is sensed by said sensing means, whereby a damaging ground fault or open circuit will prevent reduction of said impedance by said controller means and will likewise prevent advance of said controller means to a point where dynamic braking connections can be made.

References Cited in the file of this patent
UNITED STATES PATENTS

| | | |
|---|---|---|
| 850,211 | Case | Apr. 16, 1907 |
| 1,077,802 | Case | Nov. 4, 1913 |
| 2,666,175 | Seeger | Jan. 12, 1954 |